United States Patent
Hasan et al.

(10) Patent No.: US 10,305,726 B2
(45) Date of Patent: May 28, 2019

(54) CLOUD FRAMEWORK FOR MULTI-CLOUD EXTENSION

(71) Applicant: Cisco Technology, Inc., San Jose, CA (US)

(72) Inventors: Masum Z. Hasan, San Jose, CA (US); Elaine Cheong, San Jose, CA (US); Monique Jeanne Morrow, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 14/538,765

(22) Filed: Nov. 11, 2014

(65) Prior Publication Data

US 2015/0372857 A1    Dec. 24, 2015

Related U.S. Application Data

(60) Provisional application No. 62/015,516, filed on Jun. 22, 2014.

(51) Int. Cl.
*H04L 12/24* (2006.01)
*H04L 12/911* (2013.01)
*G06F 17/30* (2006.01)
*G06F 9/50* (2006.01)

(52) U.S. Cl.
CPC .......... *H04L 41/08* (2013.01); *G06F 9/5072* (2013.01); *G06F 17/30958* (2013.01); *H04L 41/22* (2013.01); *H04L 47/70* (2013.01)

(58) Field of Classification Search
CPC ......... H04L 41/08; H04L 41/22; H04L 47/70; G06F 9/5072; G06F 17/30958

USPC ........................................................ 709/220
See application file for complete search history.

(56) References Cited

U.S. PATENT DOCUMENTS

| 7,139,819 B1 * | 11/2006 | Luo | ................ H04L 41/06 709/223 |
| 8,364,819 B2 * | 1/2013 | Ferris | ................ G06F 9/5072 709/203 |
| 2010/0027552 A1 | 2/2010 | Hill | |
| 2010/0042720 A1 | 2/2010 | Stienhans et al. | |

(Continued)

OTHER PUBLICATIONS

Celesti, et al., "How to Enhance Cloud Architectures to Enable Cross-Federation", Cloud Computing (CLOUD), 2010 IEEE 3rd International Conference on, IEEE, Piscataway, NJ USA,, Jul. 5, 2010, 337-345.

(Continued)

*Primary Examiner* — Joseph L Greene
(74) *Attorney, Agent, or Firm* — Johnson, Marcou & Isaacs, LLC

(57) ABSTRACT

A representation of network resources and relationships among the network resources is established. The network resources include network resources of a tenant and network resources of a plurality of clouds. Input specifying at least one network resource of the tenant, at least one network resource of each of two of the plurality of clouds, and an action directed to the specified network resources is received in the representation. A multi-cloud extension is configured in accordance with the input. The multi-cloud extension extends to network resources of the tenant and the plurality of clouds, and is isolated from network resources of other tenants.

14 Claims, 8 Drawing Sheets

(56) References Cited

U.S. PATENT DOCUMENTS

| | | | |
|---|---|---|---|
| 2010/0106812 A1* | 4/2010 | Bernabeu-Auban | H04L 41/0806 709/221 |
| 2010/0318609 A1 | 12/2010 | Lahiri et al. | |
| 2011/0075674 A1 | 3/2011 | Li et al. | |
| 2011/0090911 A1* | 4/2011 | Hao | H04L 12/4633 370/395.53 |
| 2011/0231899 A1 | 9/2011 | Pulier et al. | |
| 2011/0261828 A1 | 10/2011 | Smith | |
| 2012/0072985 A1 | 3/2012 | Davne et al. | |
| 2012/0151057 A1 | 6/2012 | Paredes et al. | |
| 2012/0233668 A1 | 9/2012 | Leafe et al. | |
| 2012/0281706 A1 | 11/2012 | Agarwal et al. | |
| 2012/0331528 A1 | 12/2012 | Fu et al. | |
| 2013/0018994 A1 | 1/2013 | Flavel et al. | |
| 2013/0086234 A1 | 4/2013 | Salsburg et al. | |
| 2013/0346619 A1* | 12/2013 | Panuganty | H04L 41/12 709/226 |
| 2014/0006580 A1 | 1/2014 | Raghu et al. | |
| 2014/0006581 A1 | 1/2014 | Raghu et al. | |
| 2014/0040999 A1* | 2/2014 | Zhang | G06F 21/31 726/5 |
| 2014/0075565 A1* | 3/2014 | Srinivasan | G06Q 10/06315 726/26 |
| 2014/0164315 A1* | 6/2014 | Golshan | G06F 17/30011 707/608 |
| 2015/0263885 A1* | 9/2015 | Kasturi | H04L 41/5096 709/220 |
| 2015/0268935 A1* | 9/2015 | Muntes | G06F 8/20 717/105 |

OTHER PUBLICATIONS

Dewyn, "International Search Report and Written Opinion issued in International Application No. PCT/US2015/026418", dated Jul. 23, 2015, 1-10.

Dewyn, "International Search Report and Written Opinion issued in International Application No. PCT/US2015/035702", dated Jul. 24, 2015, 1-10.

Manno, et al., "FCFA: A Semantic-Based Federated Cloud Framework Architecture", 2012 International Conference on High Performance Computing & Simulation (HPCS 2012) IEEE Piscataway, NJ, USA 2012, pp. 42-52, XP002742324., Jul. 2, 2012, 42-52.

U.S. Appl. No. 14/738,794 to Hasan et al., filed Jun. 12, 2015.

Green, "Office Action issued in U.S. Appl. No. 14/738,794, filed Jun. 12, 2015", dated Mar. 23, 2017, 15 pages.

Wittmann-Regis, "International Preliminary Report on Patentability issued in International Application No. PCT/US2015/026418", dated Jan. 5, 2017, 7 pages.

Bai, "International Preliminary Report on Patentability issued in International Application No. PCT/US2015/035702," dated Jan. 5, 2017, 7 pages.

Greene, "Final Office Action issued in U.S. Appl. No. 14/738,794, filed Jun. 12, 2015", dated Sep. 14, 2017, 14 pages.

Dewyn, et al., "Summons to attend oral proceedings pursuant to Rule 115(1) EPC; EP15720170.8," mailed May 9, 2018, 7 pages.

* cited by examiner

CLOUD FRAMEWORK FOR MULTI-CLOUD EXTENSION

RELATED APPLICATIONS

This application claims priority to U.S. Provisional Patent Application No. 62/015,516, filed Jun. 22, 2014 and entitled "An Advanced Cloud Representation and Visual Framework for Multi-Cloud Elastic Extension." The complete disclosure of the above-identified priority application is hereby fully incorporated herein by reference.

TECHNICAL FIELD

The disclosed technology relates to cloud computing, and in some embodiments to extension of a single tenant cloud across multiple cloud providers.

BACKGROUND

"Cloud computing" can refer to a model for enabling ubiquitous, convenient, on-demand network access to a shared pool of configurable computing resources (e.g., networks, servers, storage, applications, and services) that may be rapidly provisioned and released with minimal management effort or service provider interaction. This cloud model may be composed of one or more of at least five characteristics, one or more of at least three service models, and one or more of at least four deployment models.

The characteristics may include the following:

On-demand self-service—A consumer may unilaterally provision computing capabilities, such as server time and network storage, as needed automatically without requiring human interaction with each service provider.

Broad network access—Capabilities may be available over the network and accessed through standard mechanisms that promote use by heterogeneous thin or thick client platforms (e.g., mobile phones, tablets, laptops, and workstations).

Resource pooling—The provider's computing resources may be pooled to serve multiple consumers using a multi-tenant model, with different physical and virtual resources dynamically assigned and reassigned according to consumer demand. There may be a sense of location independence in that the customer generally does not have any control or knowledge over the exact location of the provided resources but may be able to specify location at a higher level of abstraction (e.g., country, state, or data center). Examples of resources include storage, processing, memory, and network bandwidth.

Rapid elasticity—Capabilities may be elastically provisioned and released, in some cases automatically, to scale rapidly outward and inward commensurate with demand. To the consumer, the capabilities available for provisioning often appear to be unlimited and may be appropriated in any quantity at any time.

Measured service—Cloud systems may automatically control and optimize resource use by leveraging a metering capability at some level of abstraction appropriate to the type of service (e.g., storage, processing, bandwidth, and active user accounts). This metering may be done on a pay-per-use or charge-per-use basis. Resource usage can be monitored, controlled, and reported, providing transparency for both the provider and consumer of the utilized service.

Service models may include the following:

Software as a Service (SaaS)—The capability provided to the consumer may be to use the provider's applications running on a cloud infrastructure. A cloud infrastructure may be the collection of hardware and software that enables the characteristics of cloud computing. The cloud infrastructure may be viewed as containing both a physical layer and an abstraction layer. The physical layer may comprise the hardware resources to support the cloud services being provided, and may include server, storage, and network components. The abstraction layer may comprise the software deployed across the physical layer, which manifests the cloud characteristics. Conceptually the abstraction layer sits above the physical layer.

Platform as a Service (PaaS)—The capability provided to the consumer may be to deploy onto the cloud infrastructure consumer-created or acquired applications created using programming languages, libraries, services, and tools supported by the provider. This capability does not necessarily preclude the use of compatible programming languages, libraries, services, and tools from other sources. The consumer typically does not manage or control the underlying cloud infrastructure including network, servers, operating systems, or storage, but has control over the deployed applications and possibly configuration settings for the application-hosting environment.

Infrastructure as a Service (IaaS)—The capability provided to the consumer may be to provision processing, storage, networks, and other fundamental computing resources where the consumer may be able to deploy and run arbitrary software, which may include operating systems and applications. The consumer may not manage or control the underlying cloud infrastructure but may have control over operating systems, storage (though the consumer typically does not have control over the physical location(s) or over the entire physical storage device), and deployed applications; and possibly limited control of select networking components (e.g., host firewalls).

Deployment models may include the following:

Private cloud—The cloud infrastructure may be provisioned for exclusive use by a single organization comprising multiple consumers (e.g., business units). It may be owned, managed, and operated by the organization, a third party, or some combination of them, and it may exist on or off premises.

Community cloud—The cloud infrastructure may be provisioned for exclusive use by a specific community of consumers from organizations that have shared concerns (e.g., mission, security requirements, policy, and compliance considerations). It may be owned, managed, and operated by one or more of the organizations in the community, a third party, or some combination of them, and it may exist on or off premises.

Public cloud—The cloud infrastructure may be provisioned for open use by the general public. It may be owned, managed, and operated by a business, academic, or government organization, or some combination of them. It typically exists on the premises of the cloud provider.

Hybrid cloud—The cloud infrastructure may be a composition of two or more distinct cloud infrastructures (private, community, or public) that may remain unique entities, but may be bound together by standardized or proprietary technology that may enable data and application portability (e.g., cloud bursting for load balancing between clouds).

DETAILED DESCRIPTION OF EXAMPLE EMBODIMENTS

In a multi-cloud extension (MCE), a tenant may elastically and dynamically extend network resources, including servers, storage, virtual machines, and other resources, into a plurality of clouds, including private clouds, public clouds, community clouds, and hybrid clouds. In some embodiments, a three dimensional (3D) visualization in a graphical user interface (GUI) allows a tenant to specify one or more multi-cloud extensions. The visualization is of a graph that describes, in part, relationships between network resources. In some embodiments, the graph can be manipulated via an Application Programming Interface (API) or a Command Line Interface (CLI). Each approach can separate the tenant from the complexity of the underlying infrastructure spanning multiple organizations or cloud providers, multiple clouds, and multiple widely distributed network segments. Embodiments of the technology provide a simple mechanism to tenants to specify the MCE, where the extension, comprising multiple underlying clouds and network segments, can be manipulated as a single seamless cloud.

In example architectures for the technology, while each network device (such as a server or system) shown in the architecture is represented by one instance of the server, system, or device, multiple instances of each can be used. Further, while certain aspects of operation of the present technology are presented in examples related to the figures to facilitate enablement of the claimed invention, additional features of the present technology, also facilitating enablement of the claimed invention, are disclosed elsewhere herein.

Figure 1:
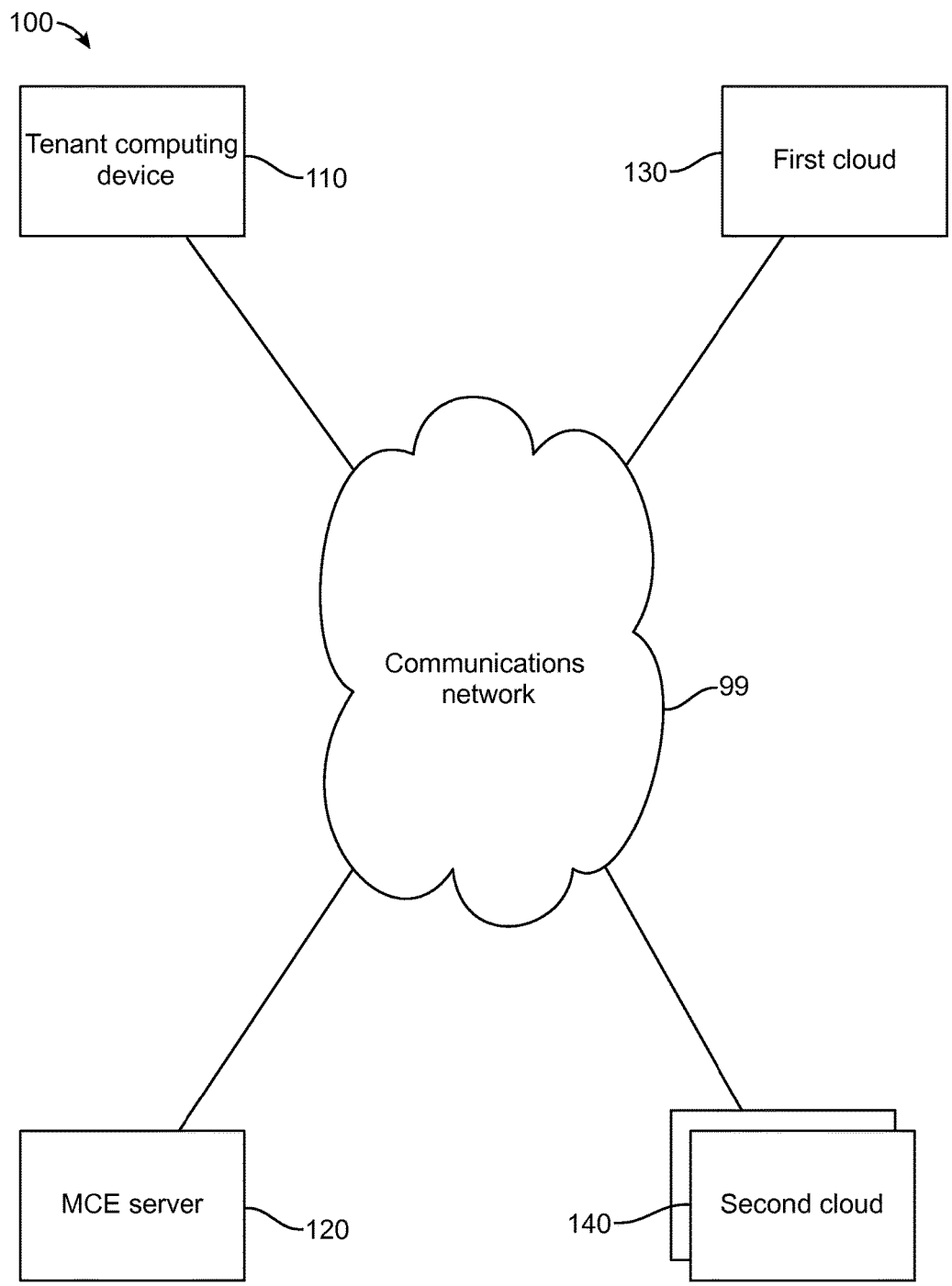
FIG. 1 is a block diagram depicting a communications and processing architecture for multi-cloud extension in accordance with certain example embodiments.

As depicted in FIG. 1, an example architecture 100 for multi-cloud extension includes network computing devices 110, 120, 130, and 140; each of which may be configured to communicate with one another via communications network 99. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

The network connections illustrated are example and other means of establishing a communications link between the devices can be used. Moreover, those having ordinary skill in the art having the benefit of the present disclosure will appreciate that the network devices illustrated in FIG. 1 may have any of several other suitable computer system configurations. For example, network device 110 may be embodied as a mobile phone or handheld computer and may not include all the components described above.

In some embodiments, network device 110 can be a client computing device of the tenant/cloud user, and network device 120 can be a server of the present technology operating both a front end (interfacing with the client) and a back end as described elsewhere herein, and network devices 130 and 140 can be devices from a first cloud provider and a second cloud provider, respectively.

Figure 8:
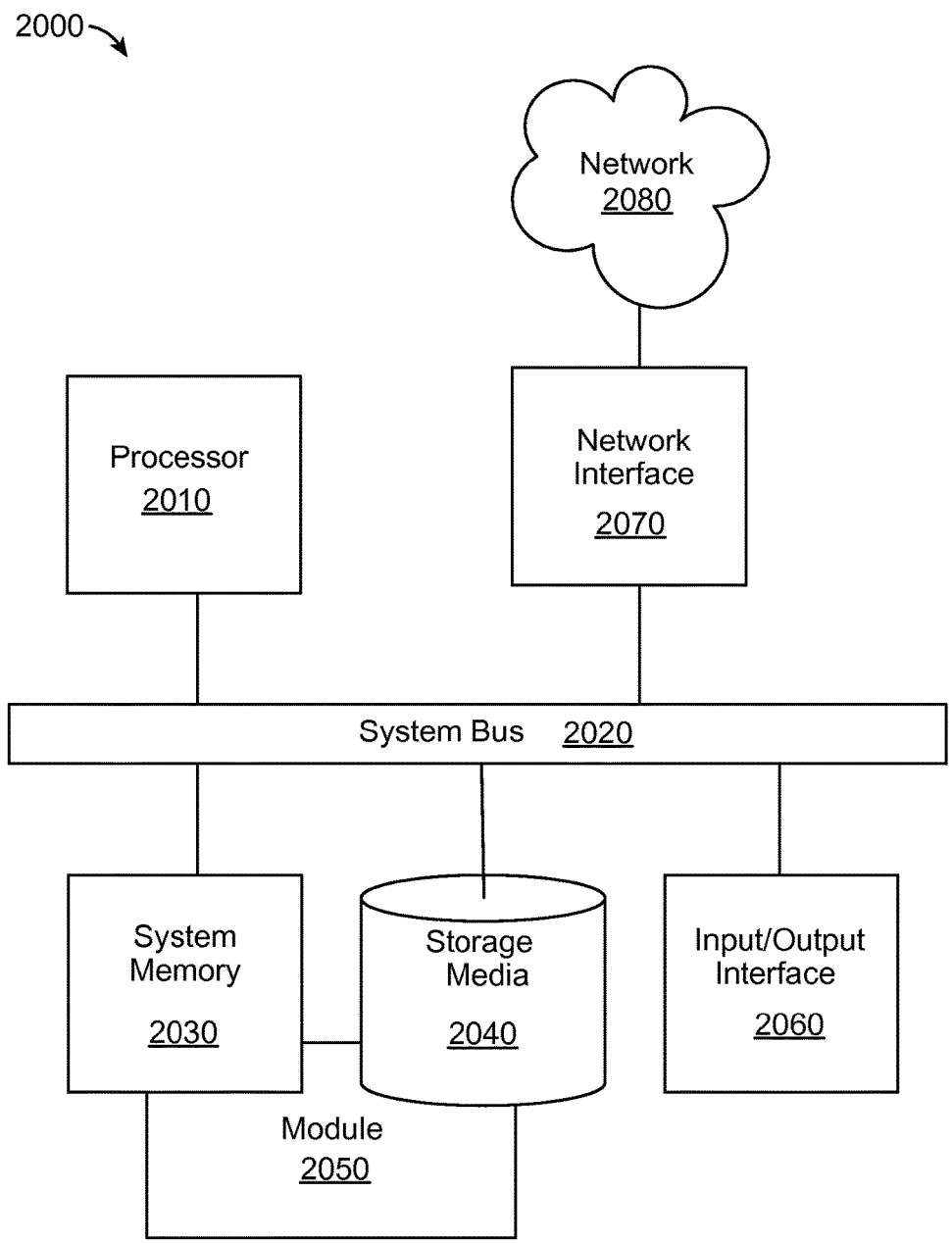
FIG. 8 is a diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may be any of the modules discussed in more detail with respect to FIG. 8. The computing machines discussed herein may communicate with one another as well as with other computer machines or communication systems over one or more networks, such as network 99. The network 99 may include any type of data or communications network, including any of the network technology discussed with respect to FIG. 8.

The example embodiments illustrated in the figures are described hereinafter with respect to the components of the example operating environment and example architecture described elsewhere herein. The example embodiments may also be practiced with other systems and in other environments.

The future of cloud computing is evolving towards a multi-cloud environment. In certain examples, a tenant may extend elastically its own private cloud or a select subset of private cloud sites and a select subset of resources in those selected sites. Note that, even if a tenant does not have its own private cloud, it may want to extend its enterprise (intranet) into multiple clouds. A private or public cloud may comprise multiple geographically distributed cloud data center (DC) sites. An enterprise may have non-DC (campus) sites from where clouds are accessed. Such extension, among others, can involve a framework including one or more front ends and a back end—either of which can be distributed.

As noted above, the MCE server 120 can include both a front end and a back end. The front end can implement the MCE representation (for example, a graph containing nodes and edges representing network resources under management and their relationships) and tenant-facing interfaces. In a cloud environment, a tenant does not own or control the end-to-end infrastructure. The tenant rather may control only its portion of the cloud or infrastructure. Hence, a tenant is provided with a tenant-facing interface, which hides complexities of the underlying infrastructure and allows a tenant to perform cloud management functions across multiple clouds. In some embodiments, one or more types of the following interfaces exist: 1) an Application Programming Interface (API), such as a Representational State Transfer (REST)-based API or a Command Line Interface (CLI); and 2) a graphical user interface (GUI). In some embodiments, a GUI receives user input and generates API or CLI calls for configuring an MCE.

The back end engine or controller can realize various aspects of cloud extension functions in the infrastructure. For example, the back end engine or controller can establish communications with each element of an MCE-cloud environment, and establish isolation for a group of some or all of the resources.

While a private cloud or tenant can extend into one public cloud, thus forming a 1:1 hybrid cloud, a tenant may then extend its private cloud into another public cloud, but does so separately, forming a second separate 1:1 cloud. Embodiments of the present technology focus on a tenant extending into multiple clouds (1:n) with the extensions as one single seamless extension.

The 1:1 hybrid cloud extension solutions may be based on two-dimensional (2D) textual or graphical visualizations. Such solutions do not offer a simple extended cloud representation and simple-to-use user interface for specification of 1:1 hybrid cloud extension—let alone 1:n multi-cloud extension (for example, one private cloud or enterprise sites and many other clouds). As described herein, some embodiments of the present technology allow a tenant to specify multiple instances of isolation and reachability. For example, each instance can be used for a specific purpose/function or distributed application.

One example comprises a framework that can be used by a tenant to specify a 1:n seamless multi-cloud extension. Some embodiments of the framework disclosed herein include a 3D visualization of the multi-cloud representation that can be rendered in a two-dimensional GUI. Note that the interface to the multi-cloud representation can be implemented in various ways, such as in a REST API or code. The visualization can also be presented in a GUI in multiple ways.

Figure 4:
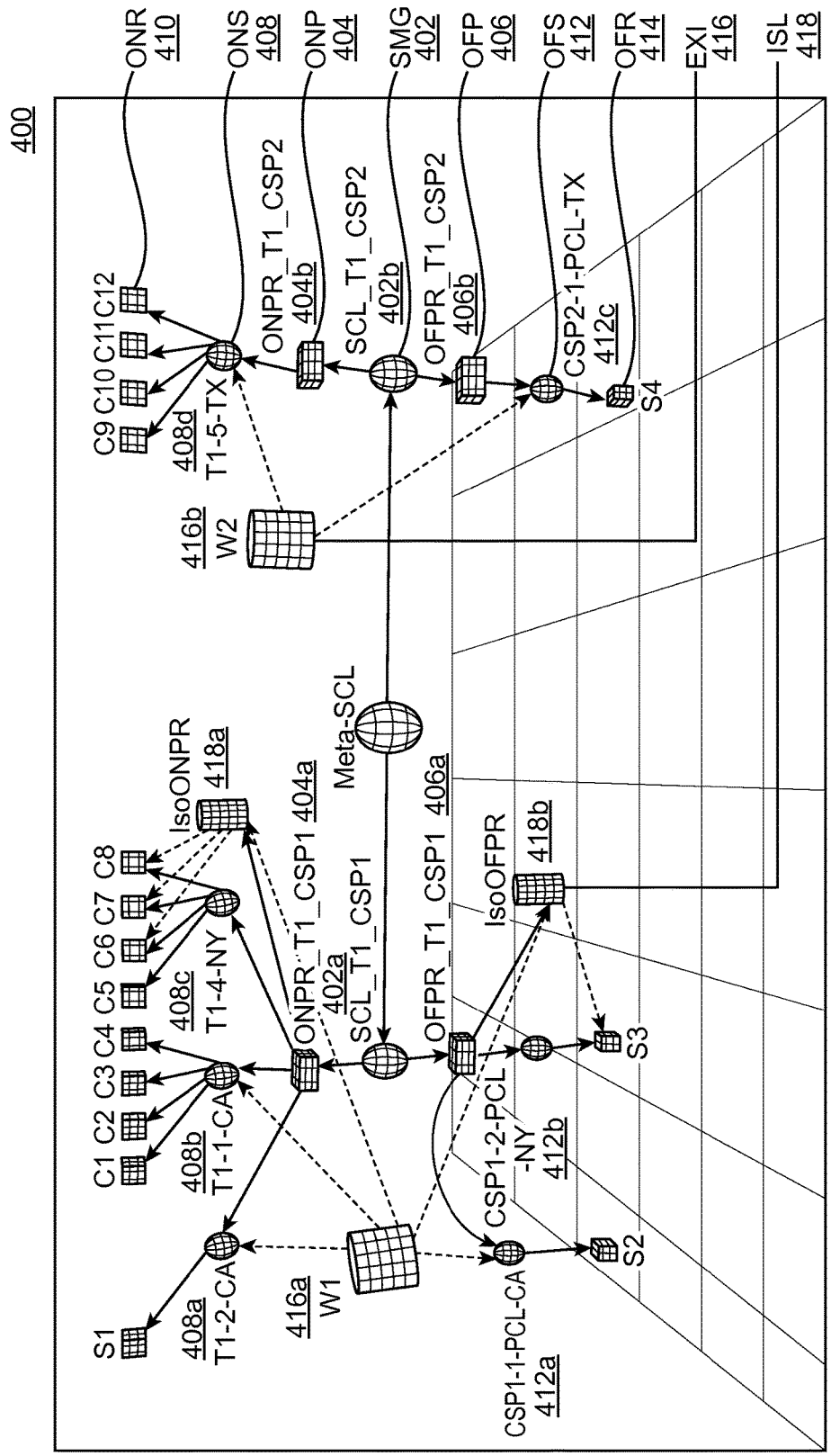
FIG. 4 illustrates a three-dimensional (3D) visualization of a graph of a tenant-created multi-cloud extension in accordance with certain example embodiments.

MCE Graph—Referring to FIG. 4, an MCE graph is shown as a 3D visualization 400. In certain embodiments of the present technology, a graph defined by nodes connected by edges represents the network resources under management for multi-cloud extension. In other words, a tenant (such as a tenant administrator) provides the input to manipulate (create, read, update, and delete—CRUD) this graph on-demand and elastically to extend to or retract from multiple clouds using 1) a 3D visualization presented by the GUI, or 2) an API and/or CLI. In some embodiments, the GUI and the API/CLI accept specification of one or more rules that automatically manipulate the MCE. The following paragraphs present characteristics of representations in the graph.

Seamless Manageability Node (SMG) 402, for example SCL_T1_CSP1 402a—A node in an MCE graph from which other nodes descend (a root node). It presents a seamless and single manageability domain for MCE management for nodes beneath it, spanning multiple organizations, clouds, and network segments. A tenant may divide this node into sub-nodes with their own roots. Any sub-graph under this type of node is seamlessly manageable. This domain basically represents a management channel. Multiple seamless manageability nodes 402 may be included in the MCE graph. Note that "SCL_T1_CSP1" stands for "Seamless Cloud, Tenant 1, Cloud Service Provider 1."

On-premises (ONP) node 404, for example ONPR_T1_CSP2 404b—This type of node can represent a private cloud. A tenant may decide to connect all or a subset of its private cloud DC sites or non-DC sites to an ONP node. Note that "ONPR_T1_CSP2" stands for "ON PRemises, Tenant 1, and Cloud Service Provider 2."

Off-premises (OFP) node 406, for example OFPR_T1_CSP1 406b—This node abstracts a cloud other than the tenant's private cloud or enterprise site. Note that "OFPR_T1_CSP1" stands for "OFf PRemises, Tenant 1, Cloud Service Provider 1."

On-premises sites (ONS) nodes 408, for example T1-5-TX 408d—Nodes abstracting private cloud or enterprise sites controlled by the tenant. In some embodiments, the ONS node 408 can be connected to an ONP node 404. Note that "T1-5-TX" stands for "Tenant 1, site 5, Texas."

On-premises resources (ONR) nodes 410, for example any one of C1-C12 and S1—A tenant may identify a subset of the resources at a site as part of the manageability domain of an MCE graph. Note that "C1" stands for "Client 1," and "S1" stands for "Server 1."

Off-premises sites (OFS) nodes 412, for example CSP1-2-PCL-NY 412b—Similar to ONS nodes 408, except that they are off-premises in other clouds (other than the tenant's private cloud or enterprise site). Note that "CSP1-2-PCL-NY" stands for "Cloud Service Provider 1, Site 2, Public Cloud, New York."

Off-premises resources (OFR) nodes 414, for example S4—Similar to ONR nodes 410, except residing in off-premises.

Extension and Isolation (EXI) Node 416, for example, W1 416a—An EXI node in the MCE graph represents two functions: extension and isolation. Resources that are associated with nodes that are connected to an EXI node are considered seamlessly extended to each other irrespective of which cloud they reside in. Resources that are associated with nodes in the graph that are transitively reachable from an EXI node are placed into a single isolation domain. The nodes (representing resources or collections of resources at sites) in each such domain are reachable to each other, but they cannot reach outside of the domain and vice versa. In an MCE graph such as visualized in GUI 400, CRUD operations can be performed on-demand and elastically. Hence a tenant can extend into or retract a given MCE from other clouds or cloud sites elastically (grow or shrink, or increment or decrement). This allows for simplified elastic extension and isolation. For example, in some embodiments, only one operation is required to extend one cloud or site (as represented by a new node) to n different other clouds or sites, which is simply connecting the new node to the desired EXI node in the GUI. This approach can represent addressing security, performance, or regulatory requirements without specifying complex policies. Multiple instances of EXI can be created using the same visualization, which also can be merged or split on-demand. For example, a tenant can create an EXI (EXI-1) that provides reachability among resources attached to the graph in one region for performance and cost reasons, and create another EXI (EXI-2) separately for a second region, then merge EXI-1 and EXI-2 on-demand, based on a time-of-day cost metric (for example, when it is cheaper to do so). Operations, for example merge and split, can be performed on the MCE on-demand (immediate request) by a user, or by specifying a rule-based action to be triggered when specified rule conditions are met.

Isolation-Local (ISL) node 418, for example IsoONPR 418a—This node isolates on-premises (or off-premises) resources within a cloud DC. When an ISL node 418 is connected to an EXI node 416, only the nodes representing resources (whether on-premises resources or off-premises resources, as the case may be) that are attached to the ISL node 418 are extended into off-premises (or on-premises as appropriate) clouds. In other words, only the resources associated with, or the resources represented by, the on-premises resource nodes (or off-premises resource nodes) attached to the ISL node 418 are reachable from off-premises (or on-premises as appropriate) and vice versa. For example, an ISL node 418 isolating off-premises resources may be connected to an EXI node 416. After this connection is made, the off-premises resources are reachable to/from other off-premises resources or on-premises resources that are connected to the EXI node 416.

The MCE graph has the following characteristics. Each node is logical. That is, each node (except the SMG node 402) has associated with it one or more real resources in the underlying infrastructure. When, for example, an MCE graph node is deleted, the associated real resources are not deleted; rather they are detached by the MCE server back end and become unreachable from the MCE. For example, an on-premises (or off-premises) resource node may have a virtual machine (VM) associated with it. When that on-premises (or off-premises) resource node is deleted from the graph, the VM is not deleted or de-provisioned; rather the VM becomes unreachable from the multi-cloud extension. When, for example, an on-premises (or off-premises) site node is deleted, the relevant site does not physically get disconnected, rather the node is detached from the graph, and thus becomes detached from the MCE, and becomes unreachable from within the MCE.

The MCE appears as one single seamless cloud as if the multi-cloud extension instance resides in tenant premises. The seamlessness capability of the graph allows seamless management, from a tenant's perspective, of all sites and resources in an MCE as if they reside in one cloud or one subnet. One single graph for all the clouds or sites of a multi-cloud extension simplifies interfaces to multiple clouds. This way the tenant does not have to interact with each cloud separately. It allows a simple and minimum number of operations to perform otherwise very complex functions. Similarly it facilitates simple and minimum numbers of point-and-clicks in a GUI, such as shown in FIG. 4. It allows a tenant full control over its multi-cloud extension instances.

Consider the following example. When a tenant wants to create a new multi-cloud extension in which to manage network resources, the tenant first creates a new SMG node 402 using any of the MCE server front ends (or tenant-facing interfaces), such as the API, CLI, or GUI. This new SMG node 402 corresponds to a new manageability domain, and all operations related to the corresponding multi-cloud extension are performed with respect to this SMG node 402 and/or other nodes connected to it.

The tenant may wish to add on-premises and/or off-premises resources to the manageability domain. In the case of on-premises resources, the tenant first creates an ONP node 404 and attaches it to the SMG node 402. The tenant then creates an ONS node 408 and attaches it to the ONP node 404. An ONS node 408 can represent a DC site. For each on-premises resource to be managed, the tenant creates an ONR node 410 and attaches it to the appropriate ONS node 408.

In the case of off-premises resources, the tenant first creates an OFP node 406 and attaches it to the SMG node 402. The tenant then creates an OFS node 412 and attaches it to the OFP node 406. An OFS node 412 can represent a DC site. For each off-premises resource to be managed, the tenant creates an OFR node 414 and attaches it to the appropriate OFS node 412.

Note the operations of adding new nodes to the MCE graph can be done in different order(s). For example, a tenant may add zero or more ONR nodes 410, add zero or more OFR nodes 414, add zero or more ONS nodes 408, and add more ONR nodes 410, and so on.

All the resources represented by nodes in a single MCE graph are considered to be part of the same manageability domain. To control reachability between resources, the tenant can add ISL 418 and/or EXI 416 node(s) to the MCE graph, and attach to them resources that should be part of the isolation domain. For example, a tenant may wish to isolate particular on-premises resources belonging to a particular site. In that case, the tenant adds an ISL node 418 to the graph, and attaches the ISL node 418 to ONR nodes 410 corresponding to the resources that should be part of the local on-premises isolation domain.

If a tenant wishes to isolate particular off-premises resources belonging to a particular site, the tenant adds a different ISL node 418 to the graph and attaches the ISL node 418 to OFR nodes 414 corresponding to the resources that should be part of the local off-premises isolation domain. When the tenant wishes to extend resources into other clouds, the tenant can add an EXI node 416 to the graph, and to this EXI node attach ONS 408, OFS 412, and/or ISL 418 nodes. Resources corresponding to nodes that are transitively reachable from the EXI node 416 are part of the same isolation domain.

GRAPHICAL USER INTERFACE (including a 3-D visualization). Cloud resources are CRUD via tenant-facing interfaces, which may comprise REST-based interfaces or APIs. The technology described herein can be incorporated into a REST API. While the REST API is appropriate at the back end, some embodiments provide a simple-to-use GUI, such as illustrated in FIG. 4, which incorporates the representations disclosed herein. Embodiments of the technology disclosed herein include a novel GUI framework with the following characteristics.

Figure 6:
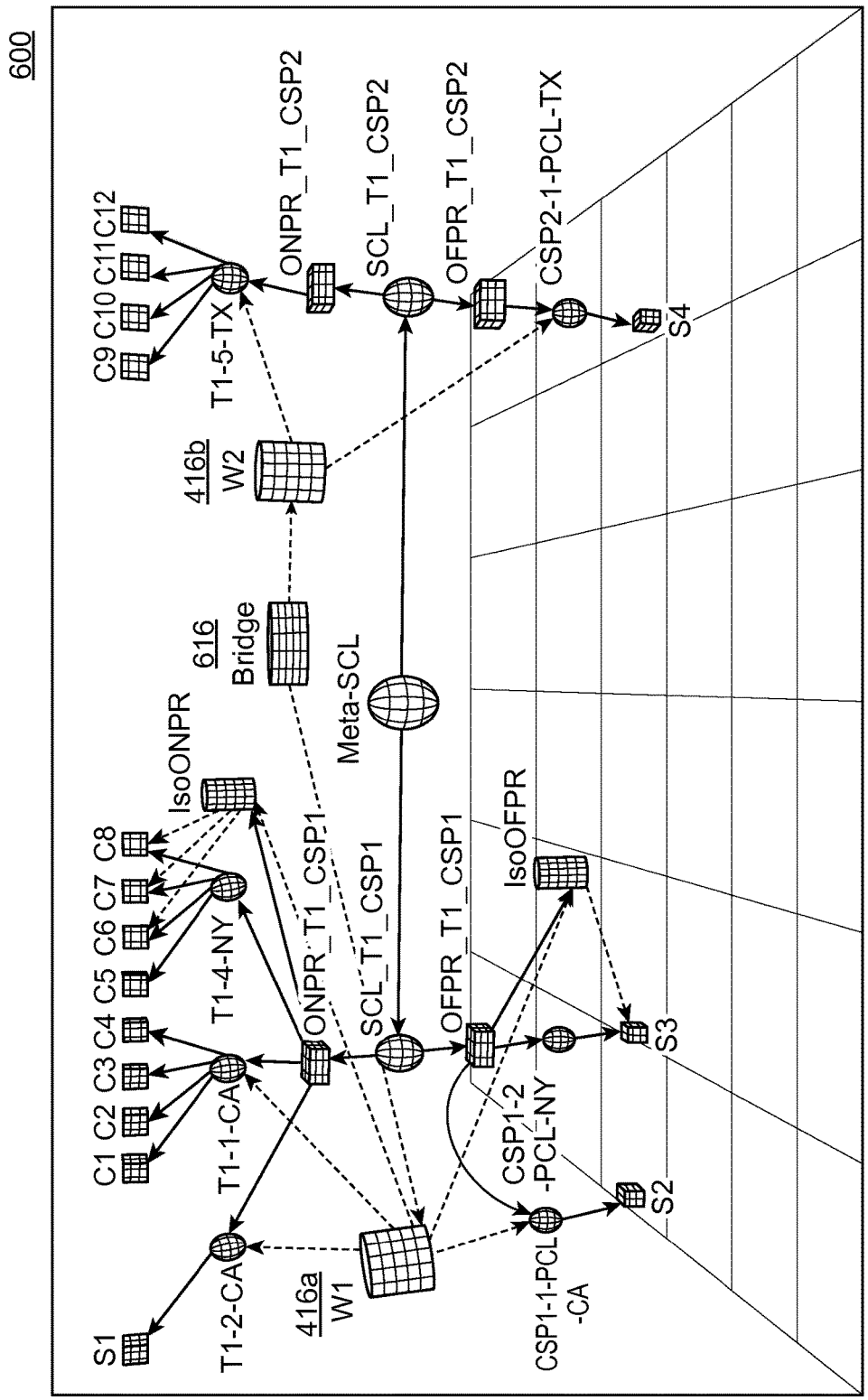
FIG. 6 illustrates W1 and W2 connected via an Extension and Isolation (EXI) node named "Bridge," in accordance with certain example embodiments.

Each MCE graph node can be represented uniquely as a 3D object in a 2D visualization, which can be tenant-defined or created. The GUI canvas can be divided into a 3D layout that corresponds to a simple-to-understand and intuitive topology as shown in FIG. 4 and FIG. 6. When needed a user can pan, zoom, and rotate the visualization in 3D space. For example, when a tenant wants to extend into a new site or cloud, it just draws a line between that site/cloud and entry point into the visualization of the MCE graph; and similarly for the Extension-Isolation (EXI) visualization. Simple point and click extends the isolation domain. For example, if a tenant wants to extend a set of on-premises sites to a set of off-premises sites and place all these sites and their connected resources in the MCE into one single isolation domain, it just clicks and connects the EXI node with the nodes to be extended and isolated. Even though a multi-cloud extension extends into multiple clouds, the tenant manipulates a single MCE graph in a 3D GUI, thus providing ease of use and seamlessness.

Figure 2:
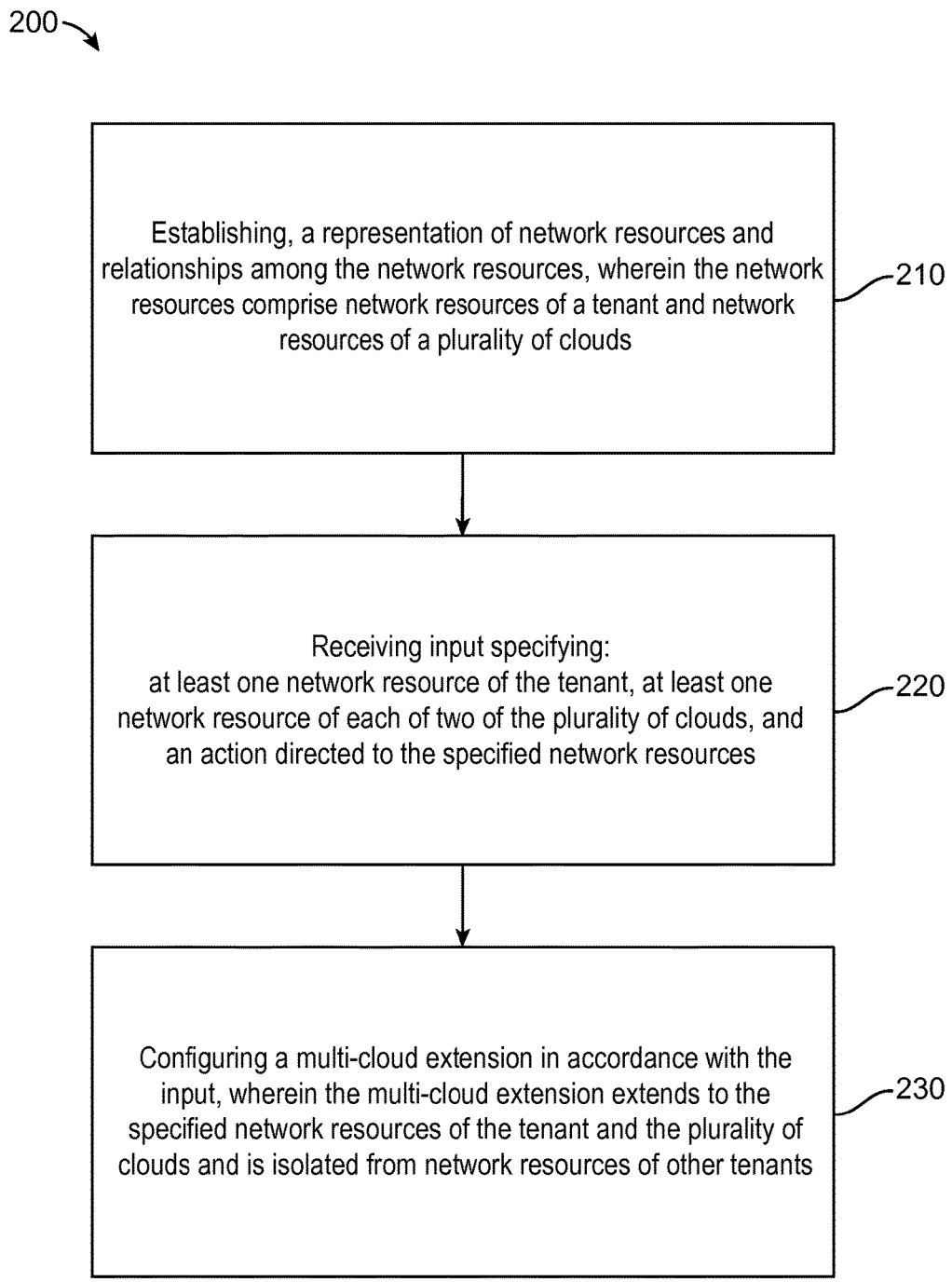
FIG. 2 is a flow chart illustrating methods for multi-cloud extension in accordance with certain example embodiments.

Referring to FIG. 2, an example method 200 for multi-cloud extension illustrating the operation of some embodiments of the present technology is shown. In such methods, a representation of network resources and relationships among the network resources is established—Block 210. The network resources include network resources of a tenant and network resources of a plurality of clouds. For example, the network resources can include the tenant's on-premises resources on the east coast, the tenant's on-premises resources on the west coast, first cloud resources with inexpensive high-bandwidth resources with respect to the tenant's east coast resources, and second cloud resources with inexpensive high-bandwidth resources with respect to both the tenant's east coast and west coast resources. The tenant's resources can include both cloud and non-cloud resources. In some such embodiments, the representation can be implemented in the front-end of MCE server 120 as described above. In the current example, the tenant first creates a new SMG node 402, and adds on-premises resources by creating an ONP node and attaching it to the SMG node. The tenant then creates an ONS node and attaches it to the ONP node, the ONS node representing an east coast site. For each on-premises resource to be managed, the tenant creates an ONR node and attaches it to the ONS node. The tenant can then create an OFP node and attach it to the SMG node. The tenant can then create OFS nodes for the two clouds and attach each OFS node to the OFP node. For each off-premises cloud resource to be managed, the tenant creates an OFR and attaches it to the appropriate OFS node.

Input specifying at least a network resource of the tenant, a network resource of each of two of the plurality of clouds, and an action directed to the specified network resources can be received—Block 220. Continuing with the current example, some resources of both the first and second clouds can be specified, among the tenant's east coast resources on Monday morning—before operation of the tenant's west coast offices begin. The action can be to extend the tenant's east coast resources into the cloud resources of both the first and second clouds. In some such embodiments, the input can be received by the front end of MCE server 120 from tenant computing device 110 over communications network 99.

More specifically, to control reachability between resources, the tenant may add an EXI node 416 to the MCE graph, and attach the resources that should be part of the isolation domain. In the current example, a tenant may wish to isolate the tenant's east coast resources, and extend those resources to the first and second clouds. In that case, the tenant can add an ISL node to the graph, and can attach the ISL node to the ONR nodes corresponding to the tenant's east coast network resources. To extend these network resources into other clouds, the tenant can add an EXI node to the graph. To this EXI node the tenant can attach the ISL node and the nodes representing each of the two clouds.

A multi-cloud extension (MCE) can be configured in accordance with the input—Block 230. The MCE is a single-tenant cloud that includes the tenant's resources and network resources of the two clouds as indicated in operation of Block 220. This MCE is isolated from network resources of other tenants. Continuing with the current example, an MCE can be created that extends the tenant's east coast resources into the clouds of both the first and second clouds, and isolates this MCE from other resources—including other resources of the tenant.

In some embodiments, a separate MCE, for example using European resources of the tenant extended into third and fourth clouds, can be isolated from the first MCE. In some such embodiments, the back end of MCE server 120 can configure the MCE.

Figure 3:
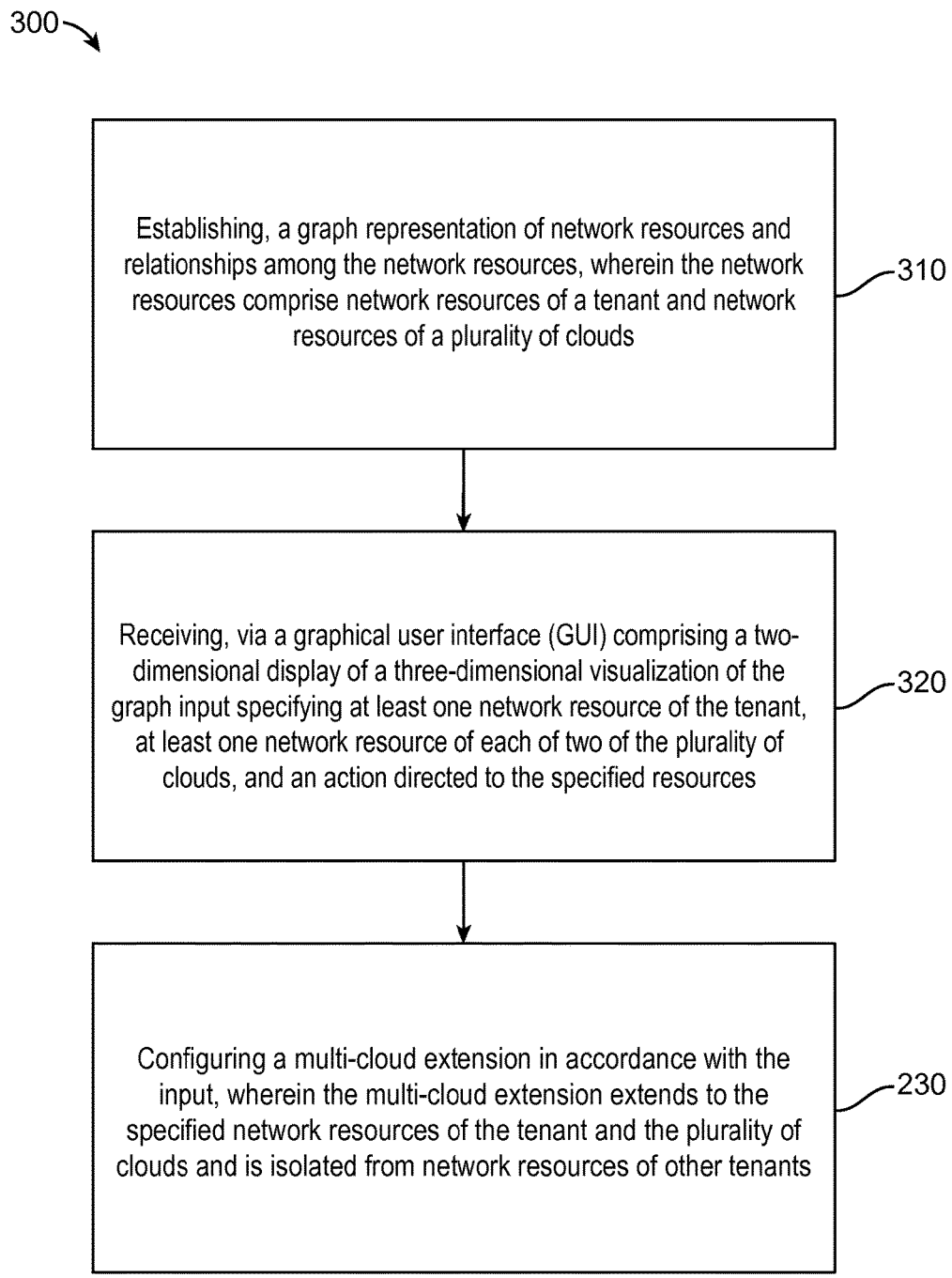
FIG. 3 is a flow chart illustrating methods for multi-cloud extension in accordance with certain example embodiments.

Referring to FIG. 3, an example method 300 for multi-cloud extension illustrating the operation of some embodiments of the present technology is shown. In such embodiments, a representation of network resources and relationships among the network resources is established comprising a graph including nodes and edges—at least one node representing one or more network resources available to the tenant—Block 310.

In some such embodiments, input specifying at least one network resource of the tenant, at least one resource of each of two clouds, and an action directed to the specified resources includes receiving such input via a graphical user interface (GUI) of a second computing device—Block 320. In such embodiments, the GUI includes a two-dimensional display of a three-dimensional visualization of the graph. In some such embodiments, the representation can be panned, zoomed, and rotated. In such embodiments, the GUI can be presented in the window of a web browser on the tenant computing device 110. In some embodiments, the GUI can be implemented in an application or in dedicated firmware or hardware.

In such embodiments, similar to the embodiments depicted in FIG. 2, a multi-cloud extension can be configured in accordance with the input, wherein the multi-cloud extension is a single-tenant cloud isolated from network resources of other tenants—Block 230.

In some embodiments, such as described in connection with FIG. 4-FIG. 7 below, the visualization includes nodes connected by edges. Each node can represent one or more resources available to the multi-cloud. In some such embodiments, the representation can be panned, zoomed, and rotated, for example, by a user of the second computing device on which the representation is displayed.

In some embodiments, the input further specifies an isolation node, such as an EXI node described above, and the action associates one or more resources with the EXI node. In such embodiments, the resources of each node associated with the EXI node are configured in a single isolation domain associated with that isolation node.

In some embodiments, input specifying a resource and an action directed to the resource is received, via the GUI, connecting two nodes with an edge.

Consider a use case presented in conjunction with FIG. 4 through FIG. 7. FIG. 4 shows a 3D visualization of an MCE graph corresponding to a tenant-created MCE instance. In FIG. 4, the CA region and NY region on-premises and off-premises clouds or sites are extended into each other via the EXI node W1 416a, and the TX region on-premises and off-premises clouds or sites are extended into each other separately via the EXI node W2 416b. In this case, the tenant may have decided that it is better to separate reachability/traffic between sites/resources under management by the MCE based on public clouds it is extending to (for example, for cost reasons), and then merge on-demand (as shown in FIG. 6).

Figure 5:
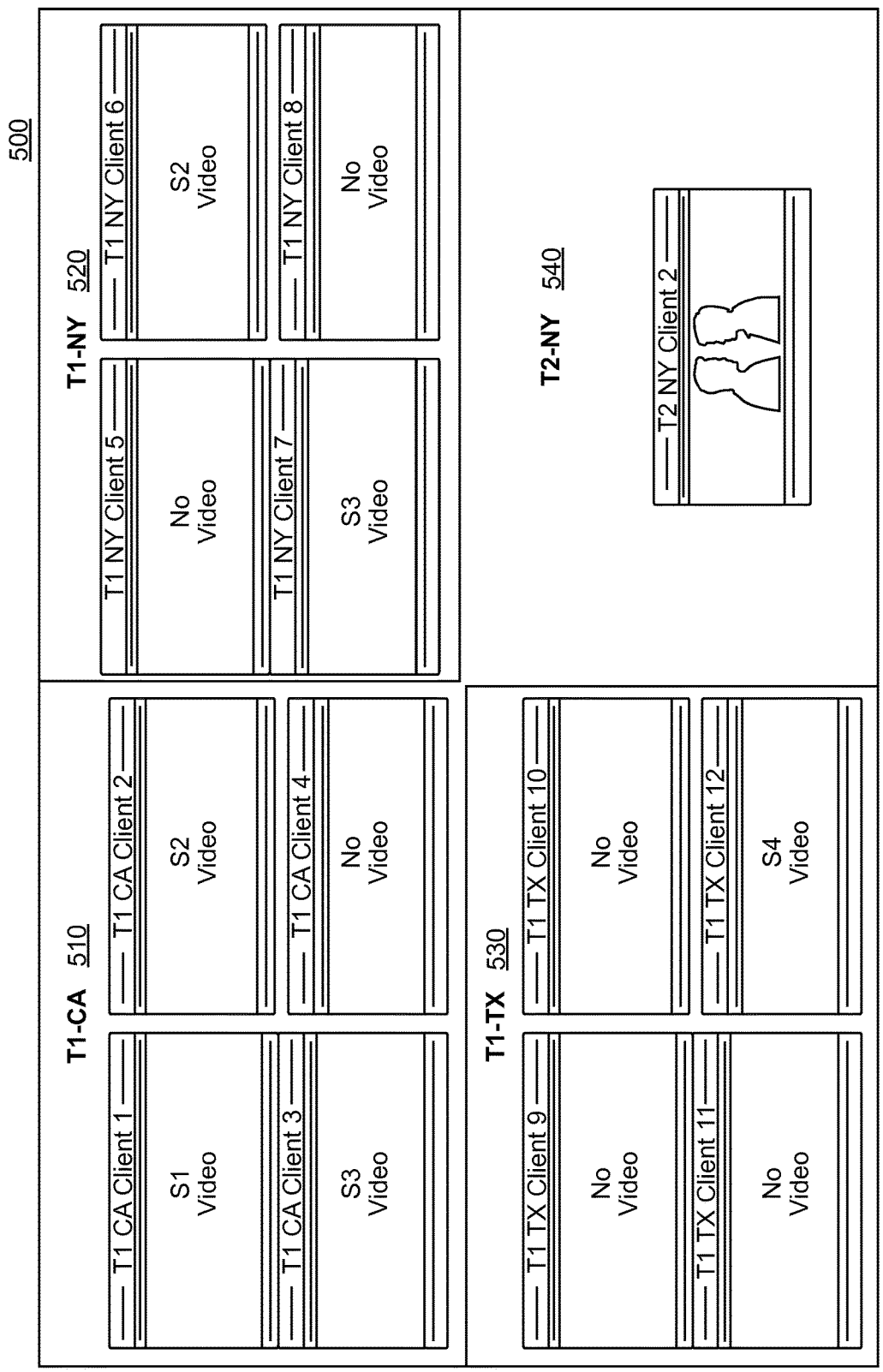
FIG. 5, in accordance with certain example embodiments, illustrates windows in each of three regions (T1-CA, T1-NY and T1-TX) of a multi-cloud extension corresponding to video streaming clients (C1-C12) residing on-premises of tenant T1. Region T2-NY corresponds to tenant T2.

In FIG. 5, an example aggregate display 500 of streaming video across several client windows is shown. The four windows in each of regions T1-CA 510, T1-NY 520 and T1-TX 530 correspond to video streaming clients C1-C12 shown in FIG. 4 and FIG. 6 as ONR 410 nodes, residing on-premises of tenant T1. The region T2-NY 540 corresponds to tenant T2. We focus on T1 only here. As shown in FIG. 5, because of EXI node W1 416*a*, region T1-CA 510 clients C1-C4, region T1-NY 520 clients C6-C8 (but not C5), and the servers S1, S2, and S3 (as shown in the MCE visualization of FIG. 4) are reachable to each other. Hence video streams from servers S1, S2, and S3 are streamed to clients C1, C2, and C3, respectively, of T1-CA 510 and video streams from S2 and S3 are streamed to clients C6 and C7, respectively of T1-NY 520. Client C12 in region T1-TX 530 displays video received from server S4, which it is receiving because of EXI node W2 416*b*. But since EXI node W2 416*b* is not connected to EXI node W1 416*a* (neither the CA region nor the NY region has been extended into the TX region and vice versa), client C4 and client C8 (each intended to receive video from S4) are not receiving video feeds. Note that client C5 in T1-NY is not receiving video because client C5 is not connected to the ISL node IsoONPR 418*b* in the MCE visualization shown in FIG. 4.

Figure 7:
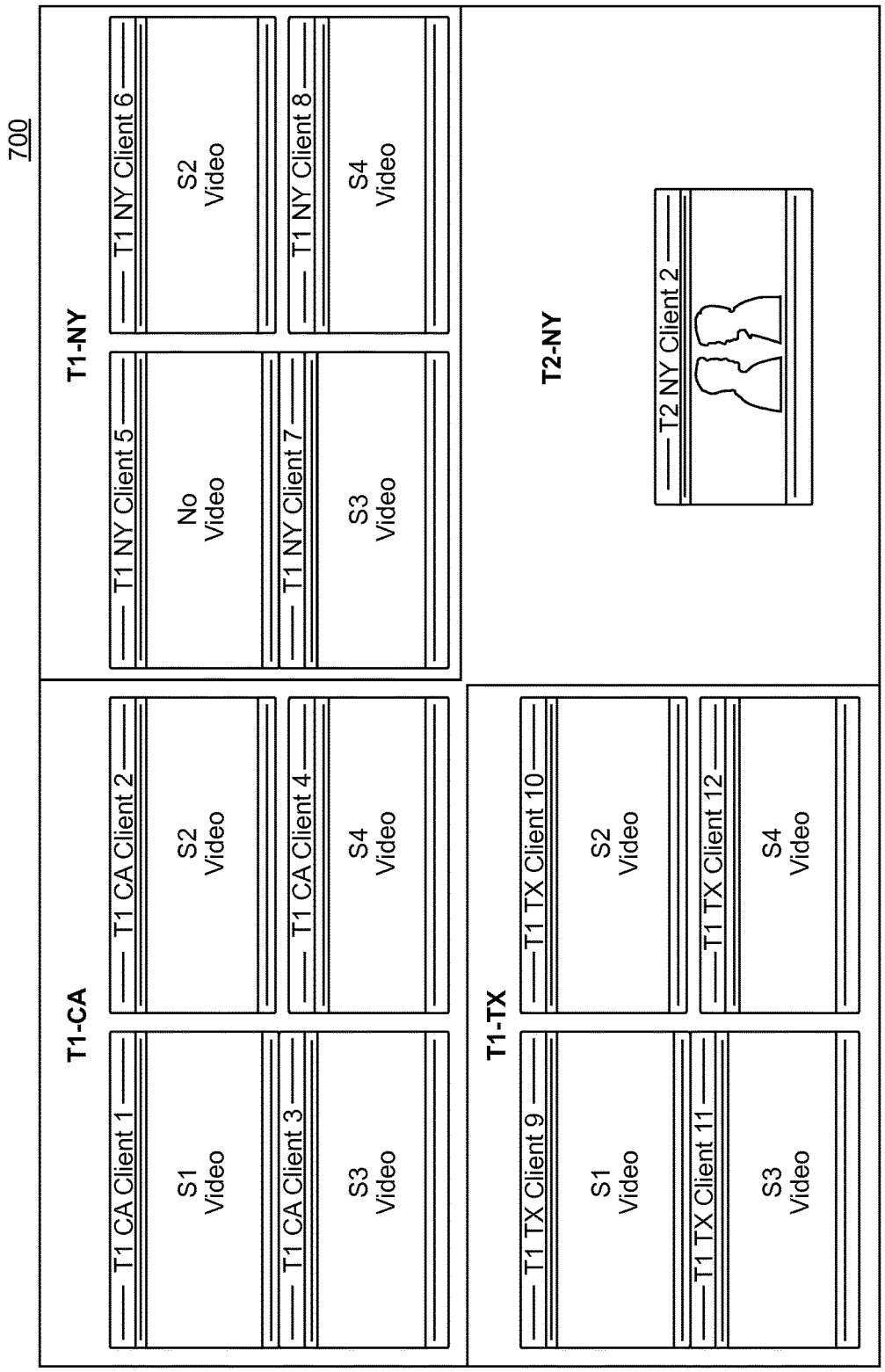
FIG. 7 illustrates video streams from TX server S4 received by clients in regions T1-CA and T1-NY, and video streams from S1, S2, and S3 servers of regions T1-CA and T1-NY received by clients in T1-TX, in accordance with certain example embodiments.

FIG. 6 illustrates an example extension and isolation of the resources under MCE management, as modified from FIG. 4. In FIG. 6, EXI node W1 416*a* and EXI node W2 416*b* have been connected (with simple point and click) via the EXI node named "Bridge" 616, thus extending CA and NY and TX regions into each other. FIG. 7 is an aggregate display 700 of streaming video across the client windows of the MCE extension visualized in FIG. 6. In FIG. 7, video streams from TX region server S4 are received by clients C4, C8, and C12; and video streams from S1, S2, and S3 servers of the CA region and NY region are received by TX clients C9, C10, and C11, based on the extension and isolation shown in FIG. 6.

FIG. 8 depicts a computing machine 2000 and a module 2050 in accordance with certain example embodiments. The computing machine 2000 may correspond to any of the various computers, servers, mobile devices, embedded systems, or computing systems presented herein, including computing systems that implement virtual machines. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one or more processors associated with a television, a customized machine, any other platform, or any combination or multiplicity thereof. The computing machine 2000 may be a distributed system configured to function using multiple computing machines interconnected via a data network or bus system. The computing machine may implement a virtual machine.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), system-in-a-package (SIP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, a virtual machine (VM), or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, the GUI may be presented as a 3D representation in an actual 3D display.

We claim:

1. A method, comprising:
   establishing, by at least one computing device, a graphical user interface (GUI) representation of network resources and relationships among the network resources,
   wherein the network resources comprise network resources of a tenant cloud and network resources of at least one second cloud,
   wherein the network resources of the tenant cloud and the network resources of the at least one second cloud are isolated from each other, and
   wherein the representation comprises a graph comprising nodes and edges, at least one node representing one or more network resources available to the tenant, and at least one edge representing manageability of the nodes connected to the edge;
   receiving, by the at least one computing device, user input via the representation specifying:
   the tenant cloud,
   at least one network resource of the at least one second cloud, and
   an extension and isolation (EXI) node; and
   configuring, by the at least one computing device, an extension to the tenant cloud in accordance with the user input, wherein the extension extends the specified tenant cloud to the specified at least one network resource of the at least one second cloud via the EXI node in a single isolation domain.

2. The method of claim 1, wherein:
   the input specifies a previously unassociated first EXI node and at least two second EXI nodes previously associated with separate extension and isolation domains;
   the action associates the two second EXI nodes with the first EXI node; and
   configuring further comprises configuring, by the first at least one computing device, the network resources of each network resource node associated with the two second EXI nodes in a single isolation domain.

3. The method of claim 1, wherein the GUI comprises a two-dimensional display of a three-dimensional visualization of the graph.

4. The method of claim 3, wherein the GUI represents at least two separate extension and isolation domains.

5. The method of claim 3, wherein the representation can be one or more of panned, zoomed, and rotated.

6. A computer program product, comprising:
   a non-transitory computer-readable storage device having computer-executable program instructions embodied thereon that when executed by a computer cause the computer to:
   establish a graphical user interface representation of network resources and relationships among the network resources, wherein the network resources comprise network resources of a tenant cloud and network resources of at least one second cloud, wherein the network resources of the tenant cloud and the network resources of the at least one second cloud are isolated from each other, and wherein the representation comprises a graph comprising nodes and edges, at least one node representing one or more network resources available to the tenant, and at least one edge representing manageability of the nodes connected to the edge;
   receive user input, via the representation specifying:
   the tenant cloud,
   at least one network resource of the at least one second cloud, and
   an extension and isolation (EXI) node; and
   configure an extension to the tenant cloud in accordance with the user input, wherein the extension extends the specified tenant cloud to the specified at least one network resource of the at least one second cloud via the EXI node in a single isolation domain.

7. The computer program product of claim 6, wherein:
   the input specifies a previously unassociated first EXI node and at least two second EXI nodes previously associated with separate extension and isolation domains;
   the action associates the two second EXI nodes with the first EXI node; and
   configuring further comprises configuring, by the first at least one computing device, the network resources of each network resource node associated with the two second EXI nodes in a single isolation domain.

8. The computer program product of claim 6 wherein the GUI comprises a two-dimensional display of a three-dimensional visualization of the graph.

9. The computer program product of claim 8, wherein the GUI represents at least two separate extension and isolation domains.

10. The computer program product of claim 8, wherein the representation can be panned, zoomed, and rotated.

11. A system, comprising:
    a storage device; and
    a processor communicatively coupled to the storage device, wherein the processor executes application code instructions that are stored in the storage device to cause the system to:
    establish a graphical user interface representation of network resources and relationships among the network resources, wherein the network resources comprise network resources of a tenant cloud and network resources oat wherein the network resources of the tenant cloud and the network resources of the at least one second cloud are isolated from each other, and wherein the representation comprises a graph comprising nodes and edges, at least one node representing one or more network resources available to the tenant, and at least one edge representing manageability of the nodes connected to the edge;
    receive user input, via the representation specifying:
    the tenant cloud,
    at least one network resource of at least one second cloud, and
    an extension and isolation (EXI) node, wherein resources that are associated with nodes connected to an EXI node are considered seamlessly extended to each other irrespective of which cloud the connected nodes reside in, and resources that are associated with nodes in the graph that are transitively reachable from an EXI node are considered to be in a single isolation domain; and
    configure an extension to the tenant cloud in accordance with the user input, wherein the extension extends the specified tenant cloud to the specified at least one network resource of the at least one second cloud via the EXI node in a single isolation domain.

12. The system of claim 11, wherein:

the input specifies a previously unassociated first EXI node and at least two second EXI nodes previously associated with separate extension and isolation domains;

the action associates the two second extension and isolation nodes with the first EXI node; and configuring further comprises configuring, by the first at least one computing device, the network resources of each network resource node associated with the two second EXI nodes in a single isolation domain.

13. The system of claim 11 wherein the GUI comprises a two-dimensional display of a three-dimensional visualization of the graph.

14. The system of claim 13, wherein the representation can be panned, zoomed, and rotated.

* * * * *